(12) United States Patent
Li et al.

(10) Patent No.: US 11,086,194 B2
(45) Date of Patent: Aug. 10, 2021

(54) CAMERA ACCESSORY MASK

(71) Applicant: Lenovo (Singapore) Pte. Ltd., Singapore (SG)

(72) Inventors: Scott Wentao Li, Cary, NC (US); Robert James Kapinos, Durham, NC (US); Russell Speight VanBlon, Raleigh, NC (US); Robert James Norton, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 216 days.

(21) Appl. No.: 16/369,104

(22) Filed: Mar. 29, 2019

(65) Prior Publication Data

US 2020/0310221 A1   Oct. 1, 2020

(51) Int. Cl.
| | |
|---|---|
| *G06K 9/00* | (2006.01) |
| *G03B 11/02* | (2021.01) |
| *G03B 17/56* | (2021.01) |
| *H04N 5/225* | (2006.01) |
| *G02B 13/06* | (2006.01) |

(52) U.S. Cl.
CPC .............. *G03B 11/02* (2013.01); *G02B 13/06* (2013.01); *G03B 17/565* (2013.01); *H04N 5/2254* (2013.01); *G03B 2206/004* (2013.01)

(58) Field of Classification Search
CPC ...... G02B 13/06; G03B 11/02; G03B 17/565; G03B 2206/004; H04N 5/2254; H04N 17/002
See application file for complete search history.

(56) References Cited

U.S. PATENT DOCUMENTS

| | | | |
|---|---|---|---|
| 9,509,361 B1* | 11/2016 | Kuhl ................... | H04M 1/0264 |
| 10,306,130 B2* | 5/2019 | Sugita ...................... | G03B 3/10 |
| 2004/0099741 A1* | 5/2004 | Dorai .................. | G06K 7/1456 |
| | | | 235/462.08 |
| 2011/0303741 A1* | 12/2011 | Bolton ................ | G06Q 10/087 |
| | | | 235/375 |

* cited by examiner

*Primary Examiner* — Tom Y Lu
(74) *Attorney, Agent, or Firm* — Ference & Associates LLC

(57) ABSTRACT

One embodiment provides a method, including: capturing, using a camera device, an image, wherein the image comprises at least one portion of a camera accessory attached to the camera device; identifying, using a processor, the camera accessory; and removing, based on the identification of the camera accessory, the at least one portion of the camera accessory from the image. Other aspects are described and claimed.

18 Claims, 3 Drawing Sheets

CAMERA ACCESSORY MASK

BACKGROUND

Advancements in camera technology have led to the development of omnidirectional cameras, also known as 360-degree cameras. These cameras may comprise a 360-degree field of view in the horizontal plane and may be configured to capture immersive images and videos. While originally utilized in specialized fields such as professional panoramic photography and robotics, 360-degree cameras have recently become more consumer-friendly and are now frequently utilized by users of all skill levels. To facilitate ease-of-use, many accessories have been developed to support the 360-degree camera.

BRIEF SUMMARY

In summary, one aspect provides a method, comprising: capturing, using a camera device, an image, wherein the image comprises at least one portion of a camera accessory attached to the camera device; identifying, using a processor, the camera accessory; and removing, based on the identification of the camera accessory, the at least one portion of the camera accessory from the image.

Another aspect provides an information handling device, comprising: a camera; a processor; a memory device that stores instructions executable by the processor to: capture, using the camera, an image, wherein the image comprises at least one portion of a camera accessory attached to the information handling device; identify the camera accessory; and remove, based on the identification of the camera accessory, the at least one portion of the camera accessory from the image.

A further aspect provides a product, comprising: a storage device that stores code, the code being executable by a processor and comprising: code that captures, using a camera device, an image, wherein the image comprises at least one portion of a camera accessory attached to the camera device; code that identifies the camera accessory; and code that removes, based on the identification of the camera accessory, the at least one portion of the camera accessory from the image.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
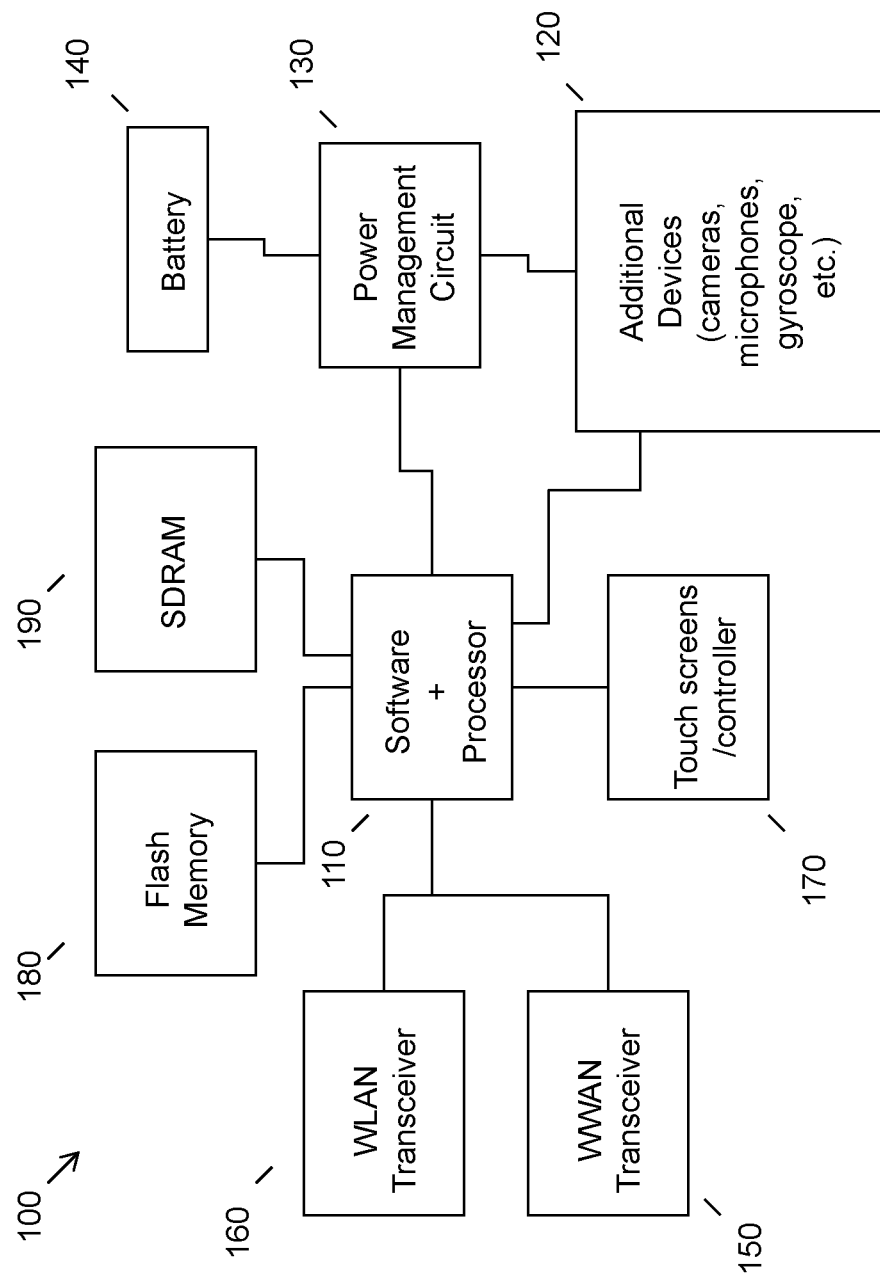
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

With the immergence of 360-degree cameras in the consumer marketspace, a variety of supplementary products have been created to provide support for these types of cameras. For instance, dedicated 360-degree camera accessories have been created to allow users to securely mount and/or transport the camera (e.g., monopods, tripods, other types of rigs or mounts, etc.). As the market for these cameras matures, more accessories having additional integrated devices (e.g., microphones, filters, etc.) will likely be made available for consumer purchase.

Images or videos captured by 360-degree cameras may be viewed on a variety of different types of information handling devices ("devices"), for example smartphones, tablets, laptops and/or personal computers, dedicated head-mounted displays ("HMDs"), and the like. These devices may comprise a variety of internal sensors (e.g., gyroscopes, etc.) or other interactive features that may allow a user to pan around the image or video (e.g., by clicking and/or dragging, physically moving the device in different directions, etc.). While navigating around the media, a user may sometimes see all, or a portion of, the camera accessory. The presence of the camera accessory in the field of view may degrade the 360-degree experience and may potentially interfere with a user's ability to see other objects.

Post-processing solutions exist for removing the presence of the camera accessory from the image. Conventionally, these solutions were implemented on computers where frame-by-frame editing was utilized to first remove the accessory from the image and thereafter blend accessory-occupied areas with the surrounding environment. Increasingly, however, post-processing is being conducted on-the-fly using various mobile devices (e.g., smartphones, tablets, etc.). One issue with mobile post-processing is that many current mobile devices do not have a processor powerful enough to perform the image editing in a timely fashion. Another issue is that image editing functions consume a great deal of device power, thereby greatly shortening a battery life of the mobile device. Furthermore, post-processing techniques that utilize edge-detection algorithms may occasionally blur areas of the image around the removed accessory if there was movement when the image was captured, which is frequently the case when the 360-degree camera is attached to a mobile, handheld mount.

Accordingly, an embodiment provides a method for dynamically removing the presence of a camera accessory from an image. In an embodiment, a camera of a device may be used to capture an image. The camera may be a 360-degree camera, a wide-angle lens camera, etc. An embodiment may then identify a camera accessory attached to the camera using identifying information associated with the camera accessory. The identifying information may correspond to a type of the camera accessory, a model of the camera accessory, dimensional aspects of the camera accessory, etc. In an embodiment, the identification may be facilitated by receiving the identifying information from the camera accessory (e.g., via a wired or wireless transmission, etc.). Alternatively, in another embodiment, the identification may be facilitated by identifying an object (e.g., a QR code, etc.) located on the camera accessory that may be scanned and analyzed to reveal the identifying information. An embodiment may thereafter remove any presence of the camera accessory from the image. Such a method may be used to enhance or eliminate post-processing.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
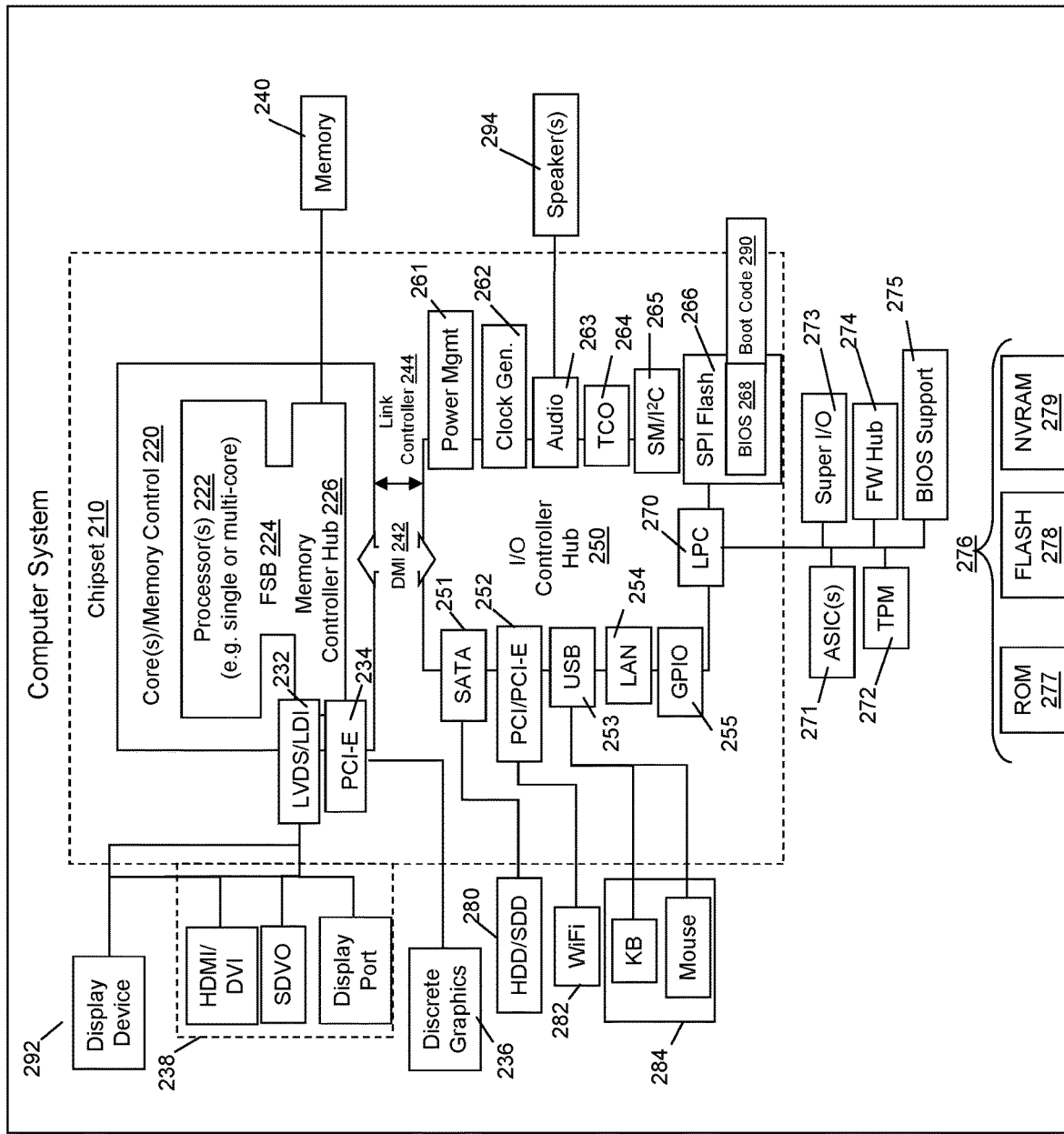
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as dedicated omnidirectional cameras, smart phones, tablets, laptops, and/or electronic devices that may be capable of capturing and/or viewing images and videos. For example, the circuitry outlined in FIG. 1 may be implemented in a tablet or smart phone embodiment, whereas the circuitry outlined in FIG. 2 may be implemented in a laptop.

Figure 3:
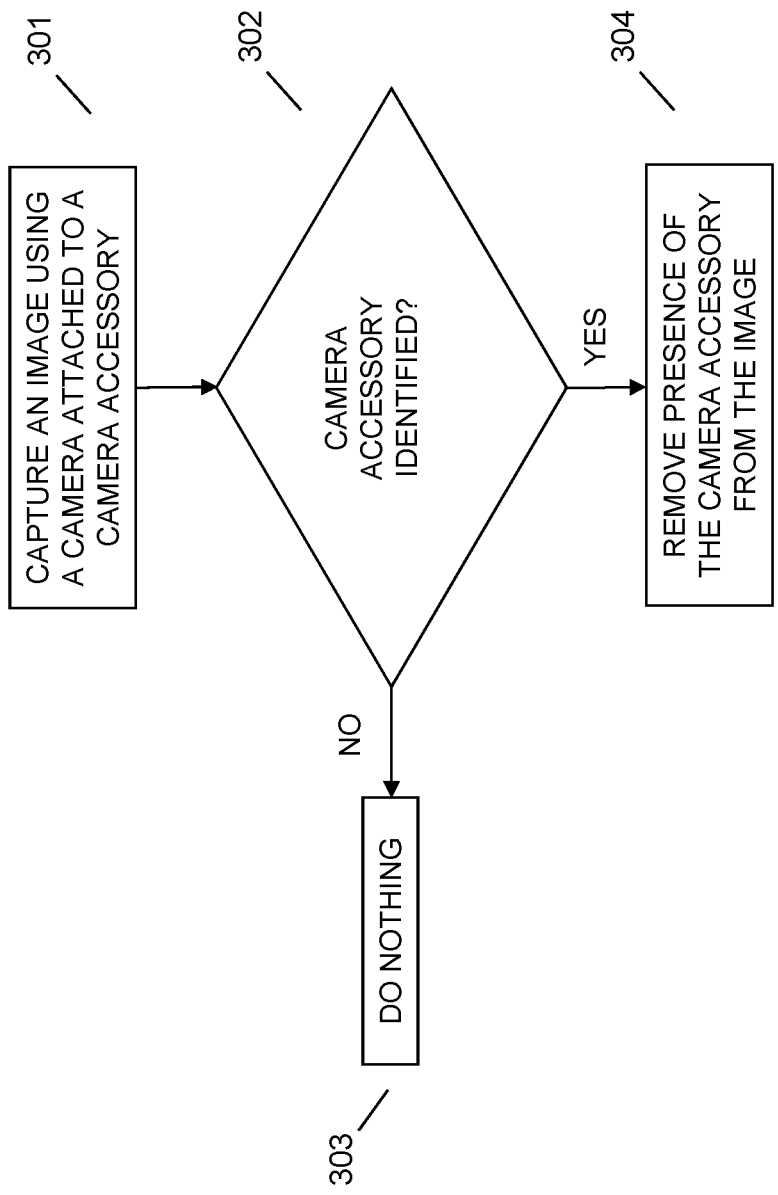
FIG. 3 illustrates an example method of performing functions with a camera situated underneath a display of an information handling device.

Referring now to FIG. 3, an embodiment may remove the presence of a camera accessory from a captured image. At 301, an embodiment may capture an image using a camera of a device. In an embodiment, the camera may be virtually any type of camera. For example, the camera may be a conventional camera found in most smartphones, tablets, etc. Alternatively, the camera may be an omnidirectional camera (e.g., a 360-degree camera, a wide-angle lens camera, etc.) having a field of view greater than 180 degrees and potentially up to 360 degrees. In an embodiment, the camera may be a standalone camera or, alternatively, may be a camera integrated into another device (e.g., smartphone, tablet, etc.). For simplicity purposes, the term "camera device" will be utilized to refer to both independent cameras and cameras integrated into other devices. In the context of this application, an image captured by the camera may refer to a static image (e.g., a photograph, etc.) or a dynamic image (e.g., a video, etc.).

In an embodiment, the captured image may comprise all, or a portion of, a camera accessory ("accessory") attached to the camera device. In the context of this application, an accessory may be virtually any type of accessory attachable to the camera device. For instance, an accessory may be a smartphone mounting rod colloquially known as a "selfie stick", a handheld monopod jib, a tripod, another type of rig or mount, and the like. As an example of an image comprising a camera accessory, a portion of a selfie stick may be present in an image captured by a smartphone camera. As another example, a portion of a tripod may be present in an image captured by a 360-degree camera mounted on top of the tripod.

At 302, an embodiment may identify the camera accessory ("accessory") attached to the camera device. In an embodiment, the accessory may be identified responsive to receiving, at the camera device, identifying information about the accessory. The identifying information may describe, for example, the type of accessory being utilized (e.g., a tripod or a handheld monopod, etc.), the model or brand of the accessory, the shape or color of the accessory, the way the accessory generally appears in an image, a combination thereof, and the like.

In an embodiment, the identification of the accessory may be facilitated by receiving the identifying information from the accessory at the camera device. In an embodiment, the accessory may comprise an integrated data store that comprises the identifying information (e.g., stored as metadata, etc.). The identifying information may be provided to the data store at the time of manufacturing of the accessory. In an embodiment, the identifying information may be transmitted to the device via a wired or wireless connection (e.g., BLUETOOTH connection, near-field communication (NFC) transmission, another wireless transmission technique, etc.). In an embodiment, a user may manually transmit the identifying information from the accessory to the device (e.g., via actuation of a transmission button located on the accessory, etc.). Alternatively, in another embodiment, the transmission may occur automatically (e.g., when a physical or wireless connection is established between the accessory and the device, when the accessory and the device come within a predetermined threshold distance, etc.).

In an embodiment, the identification of the identifying information may be facilitated by identifying, in a field of view of the camera, an identifying information holding object ("object") on the camera accessory. In an embodiment, the object may be a quick response ("QR") code found, for example, on a sticker attached to the device or, alternatively, etched directly into the device. The QR code may comprise the identifying information for the accessory. In an embodiment, an image of the QR code may be captured by the camera, which may thereafter be sent to a QR reader application (e.g., resident locally on the device or resident remotely on another device, etc.) for decoding. In an embodiment, the QR code may be scanned before or after an image is taken. For example, in the case of the former, prior to capturing the image an embodiment may identify the presence of the QR code in a field of view of the camera and automatically scan it. In the case of the latter, an embodiment may check for the presence of a QR code in a captured image and, responsive to identifying that a QR code exists, automatically scan it.

Responsive to not identifying, at 302, the camera accessory, an embodiment may, at 303, take no additional action. Additionally or alternatively, an embodiment may provide a notification to a user (e.g., on the camera device, on another device associated with a user, etc.) that the accessory could not be identified. In such a situation, an embodiment may request the user to manually identify the accessory (e.g., from a drop-down list, etc.). Conversely, responsive to identifying, at 302, the accessory, an embodiment may, at 303, remove substantially any presence of the accessory from the image.

In an embodiment, the removal of all, or portions of, the accessory from the image may be conducted using the received identifying information. More particularly, the identifying information may provide an indication of the shape, dimensions, and/or position of the accessory so that an embodiment may be able to identify the areas of the image occupied by the accessory. Thereafter, an embodiment may engage one or more image editing and/or object filtering processes to remove the accessory from the occupied portions. For example, in an embodiment, the removal of the accessory may involve the provision of a virtual mask that may cover portions of the image occupied by the accessory. In an embodiment, the mask may be dynamically/algorithmically generated by the camera from the dimensionally descriptive identifying information based on the camera model and/or accessory attachment points. Additionally, the virtual mask may be comprised of blended areas of surrounding portions of the image to reduce any apparent effects of the accessory removal. In an embodiment, the aforementioned QR code may also be utilized as a reference mark to identify the position that the accessory is located in the image. More particularly, in situations where the accessory is fixed and does not move with respect to the camera device, an embodiment may always use the position of the QR code from which to base the removal editing of the accessory. In an embodiment, the foregoing removal processes may be conducted automatically, without any additional user input.

The various embodiments described herein thus represent a technical improvement to conventional image processing techniques. Using the techniques described herein, an embodiment may capture an image (e.g., a standard image, a 360-degree image, another image type, etc.) using a camera of a camera device. An embodiment may also identify an accessory attached to the camera device. The accessory may be identified by, for example, receiving identifying information associated with the accessory that may provide an indication what the camera accessory is. The identifying information may be received at the camera device using one or more transmission techniques (e.g., direction transmission from the accessory, from identification of a QR code on the accessory, etc.) Thereafter, an embodiment may remove a presence of the accessory from the image. Such a method may allow images to be edited in a quick and efficient way without the battery draining effects of conventional mobile image editing techniques.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, using a camera device, an image, wherein the image comprises at least one portion of a camera accessory attached to the camera device;
    identifying, using a processor, the camera accessory; and
    removing, based on the identification of the camera accessory, the at least one portion of the camera accessory from the image, wherein the removing comprises providing a mask concealing the at least one portion of the camera accessory, wherein the mask is pre-computed based on at least one of: an aspect of the camera accessory and a property of the camera device.

2. The method of claim 1, wherein the camera device comprises a 360-degree camera.

3. The method of claim 1, wherein the identifying comprises receiving identifying information associated with the camera accessory.

4. The method of claim 3, wherein the identifying information comprises information selected from the group consisting of: a type of the camera accessory, a model of the camera accessory, and a dimensional shape of the camera accessory.

5. The method of claim 3, wherein the receiving comprises receiving, from the camera accessory, the identifying information.

6. The method of claim 5, wherein the receiving the identifying information from the camera accessory comprises automatically receiving the identifying information when a connection is established between the camera accessory and the camera device.

7. The method of claim 3, wherein the receiving comprises identifying, in a field of view of a camera of the camera device, an identifying object on the camera accessory.

8. The method of claim 7, wherein the identifying object is a QR code.

9. The method of claim 8, further comprising utilizing the QR code as a reference mark for the removing.

10. An information handling device, comprising:
    a camera;
    a processor;
    a memory device that stores instructions executable by the processor to:
    capture, using the camera, an image, wherein the image comprises at least one portion of a camera accessory attached to the information handling device;
    identify the camera accessory; and remove, based on the identification of the camera accessory, the at least one portion of the camera accessory from the image, wherein the removing comprises providing a mask concealing the at least one portion of the camera accessory, wherein the mask is pre-computed based on at least one of: an aspect of the camera accessory and a property of the camera device.

11. The information handling device of claim 10, wherein the camera is a 360-degree camera.

12. The information handling device of claim 10, wherein the instructions executable by the processor to identify comprise instructions executable by the processor to receive identifying information associated with the camera accessory.

13. The information handling device of claim 12, wherein the identifying information comprises information selected from the group consisting of: a type of the camera accessory, a model of the camera accessory, and a dimensional shape of the camera accessory.

14. The information handling device of claim 12, wherein the instructions executable by the processor to receive comprise instructions executable by the processor to receive, from the camera accessory, the identifying information.

15. The information handling device of claim 12, wherein the instructions executable by the processor to receive comprise instructions executable by the processor to identify, in a field of view of the camera, an identifying object on the camera accessory.

16. The information handling device of claim 15, wherein the identifying object is a QR code.

17. The information handling device of claim 16, wherein the instructions are further executable by the processor to utilize the QR code as a reference mark for the removing.

18. A product, comprising:
a storage device that stores code, the code being executable by a processor and comprising:
code that captures, using a camera device, an image, wherein the image comprises at least one portion of a camera accessory attached to the camera device;
code that identifies the camera accessory; and
code that removes, based on the identification of the camera accessory, the at least one portion of the camera accessory from the image, wherein the removing comprises providing a mask concealing the at least one portion of the camera accessory, wherein the mask is pre-computed based on at least one of: an aspect of the camera accessory and a property of the camera device.

* * * * *